(12) United States Patent
Kharia et al.

(10) Patent No.: US 8,504,118 B2
(45) Date of Patent: Aug. 6, 2013

(54) SYSTEM AND METHOD FOR OPTIMIZING BATTERY POWER

(75) Inventors: Yash Kharia, San Diego, CA (US); Anupam Juneja, San Diego, CA (US); Atul Suri, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 980 days.

(21) Appl. No.: 11/548,459

(22) Filed: Oct. 11, 2006

(65) Prior Publication Data

US 2010/0273486 A1 Oct. 28, 2010

(51) Int. Cl.
*H04B 1/38* (2006.01)
*H04B 1/16* (2006.01)
*H04W 36/00* (2009.01)
*H04M 1/00* (2006.01)
*G08C 17/00* (2006.01)

(52) U.S. Cl.
USPC ..... 455/574; 455/343.2; 455/436; 455/552.1; 370/311

(58) Field of Classification Search
USPC ... 455/571, 572, 573, 574, 436, 343.1–343.6, 455/406, 552.1, 553.1; 320/100–167; 340/636.1, 636.11–19, 636.2; 370/311
See application file for complete search history.

(56) References Cited

U.S. PATENT DOCUMENTS

| | | | | |
|---|---|---|---|---|
| 5,248,929 A | * | 9/1993 | Burke | 320/127 |
| 5,465,401 A | * | 11/1995 | Thompson | 455/558 |
| 6,108,526 A | * | 8/2000 | van der Plas | 455/78 |
| 6,484,110 B1 | * | 11/2002 | Jung | 702/63 |
| 6,487,401 B2 | * | 11/2002 | Suryanarayana et al. | 455/406 |
| 6,748,246 B1 | * | 6/2004 | Khullar | 455/574 |
| 6,943,693 B2 | * | 9/2005 | Kim | 340/636.1 |
| 7,528,577 B2 | * | 5/2009 | Hara et al. | 320/132 |
| 8,135,443 B2 | * | 3/2012 | Aleksic et al. | 455/574 |
| 2004/0029621 A1 | * | 2/2004 | Karaoguz et al. | 455/574 |
| 2004/0098222 A1 | * | 5/2004 | Pehrsson et al. | 702/176 |
| 2004/0204174 A1 | * | 10/2004 | Pehrsson | 455/572 |
| 2006/0006842 A1 | | 1/2006 | Miskovic et al. | |
| 2007/0011503 A1 | * | 1/2007 | Kitani et al. | 714/704 |

* cited by examiner

*Primary Examiner* — Christopher M Brandt (57) ABSTRACT

A wireless communication device, a wireless communication system, and a method for optimizing battery power resources are described. The wireless communication device comprises a rechargeable battery, a control module, and a display. The control module is operatively coupled to the rechargeable battery and is configured to determine a first remaining battery time associated with a first operational mode, and a second remaining battery time associated with a second operational mode. The display operatively is coupled to the control module and is adapted to display both remaining battery times. The wireless communication system comprises antennas configured to communicate using both operational modes. The method comprises accessing a network system, estimating battery metrics based on current battery power, querying a table that associates battery power metrics with different radio access technologies, and generating a table output that displays the remaining battery time associated with each of the wireless technologies.

10 Claims, 6 Drawing Sheets

SYSTEM AND METHOD FOR OPTIMIZING BATTERY POWER

FIELD OF THE INVENTION

This invention relates to optimizing the remaining battery time for a rechargeable battery on a wireless handset. More particularly, the invention relates to multi-mode wireless handsets and optimizing the battery time on the multi-mode wireless handsets.

BACKGROUND

Wireless mobile phones have become one of the most commonly used electronic devices. The reliance on wireless mobile services, whether it is for simple telephony, personal computing functions, or web services, is increasing exponentially. Present day cellular telephones use batteries that do not need to be charged on a daily basis. As a result, a cell phone user often forgets to check the charge level of the cell phone battery for extended periods of time. This leads to the battery losing all of its capacity, leaving the cell phone inoperable. The fact that the battery is "dead" prevents a user from initiating phone calls as well as receiving incoming phone calls when she is not near a battery charger or an alternative power source. Even in the most mundane and normal of circumstances, this sudden inability to communicate or stay in touch via one's mobile phone can be extremely debilitating because of the increasingly reliance and dependability on the use of wireless mobile devices. Thus, if a mobile phone runs out of batteries and becomes inoperative, the user is unable to receive or place any calls or even power up to receive and display messages.

Consequently, several mechanisms are in place to avert such undesirable situations. Typically, most handset devices have bars shown in the display section of the handset indicating the level of remaining battery power. However, the information is often vague and impractical. No percentage is indicated and there is no precise estimate or indication on the remaining battery time left. Even if some indication is given by an icon on the display, most battery indicators on handsets do not distinguish between talk time and standby time, which greatly affect battery life. In other words, if a handset indicates that one one-fourth of the battery life remains, the user does not know how long this translates to actual voice talk time or how much of standby time the handset has left.

Furthermore, indicators are displayed in cell phones warning the user when the batteries are losing power and have low capacity. Some display or otherwise indicate "low battery" (i.e., low capacity) warnings and/or a battery's capacity level, or even flash the battery icon in the device display. Others even provide a more invasive type of warning such as continuous warning tone. These existing solutions fail to enable users to actively take charge of how to best use the remaining power and manage power resources in order to optimize battery life.

Additionally, wireless handsets are being designed to operate as multi-mode phones. Depending on the operational mode, the battery power that is consumed can vary substantially. By way of example and not of limitation, if a phone is CDMA enabled and WLAN enabled, the remaining battery time in the CDMA mode is longer than the remaining battery time in the WLAN mode, however, this fact is not communicated to the user.

SUMMARY

A wireless communication device, a wireless communication system, and a method for optimizing battery power resources are described. The wireless communication device comprises a rechargeable battery, a control module, and a display. The control module is configured to communicate using a first operational mode and a second operational mode different from the first operational mode. The control module is operatively coupled to the rechargeable battery and is configured to determine a first remaining battery time associated with the first operational mode, and a second remaining battery time associated with the second operational mode. The display is operatively coupled to the control module and displays the first and the second remaining battery time.

The wireless communication system comprises a plurality of first antennas, a second antenna, and the wireless communications device. The plurality of first antennas is adapted to communicate with the wireless communication device using a first operational mode. The second antenna is adapted to communicate with the wireless communication device using a second operational mode that is different from the first operational mode. The wireless communication device comprises the control module, the rechargeable battery, and the display.

The method for optimizing battery power resources on the wireless communication device is also described. The method comprises accessing a network system from the wireless communication device. The network system is configured to communicate with the wireless communication device. The method also comprises estimating battery power metrics, based on current available battery power. The method further comprises querying a corresponding table that associates the battery power metrics with each of the wireless technologies, and generating a table output that displays the remaining battery time estimate associated with each of the wireless technologies.

DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and apparatus described hereinafter may vary as to configuration and as to details. Additionally, the method may vary as to details, order of the actions, or other variations without departing from the illustrative method disclosed herein.

Figure 1:
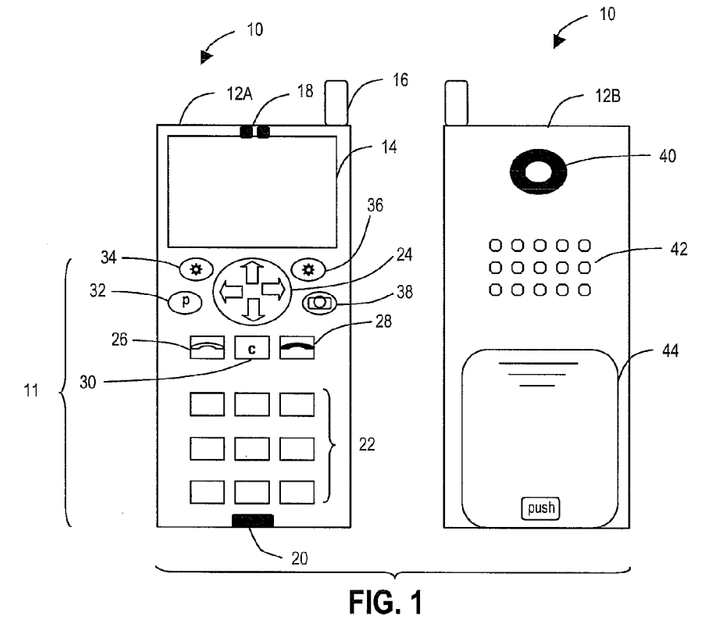
FIG. 1 shows an exemplary wireless communication device according to one embodiment of the present invention.

Referring to FIG. 1, there is shown an illustrative wireless communication device 10 that allows optimal usage and management of battery power resources. By way of example and not of limitation, the wireless communication device 10 is a wireless handset 10 but it may be any type of mobile wireless communication device such as a portable cell phone, mobile handset, mobile phone, wireless phone, cellular phone, portable phone, a personal digital assistant (PDA), Blackberry, smart telephones, or any type of personal mobile terminals which are regularly carried by a user having all the elements necessary for operation in a wireless communication system.

The wireless handset 10 is further adapted for user operation and includes a front body 12A, a display 14, one or more antennas 16, speaker 18, microphone 20, and an input interface 11 that has a number of push buttons enabling a user to manually input data and/or instructions to the wireless handset 10. The input interface 11 includes, for example, a normal key pad 22, such as key pad for the wireless handset 10 or a PDA, and may additionally include specific input keys, such as a scrolling means 24 to input particular instructions or to perform particular selection functions. Additionally, the input interface 11 has further buttons such as a call button or key button 26, which provides the Enter or OK function, a no-call key 28, and a cancel button 30. Further, an additional button 32 may be used for other wireless handset 10 functions to activate, for example, a MP3 player or other types of entertainment functions. Soft key button 34 and 36 are used to select other functions which are displayed for user selection on the display 14. Button 38 is provided for quickly activating camera or video functions. Display 14, which provides a user interface for the wireless handset 10, may also be configured so that users may access and see information such as type of service, data rate, talk time, and signal strength. FIG. 1 also illustrates the back side 12B of the wireless handset 10 where it includes a camera means 40, another speaker 42, and a battery 44.

Figure 2:
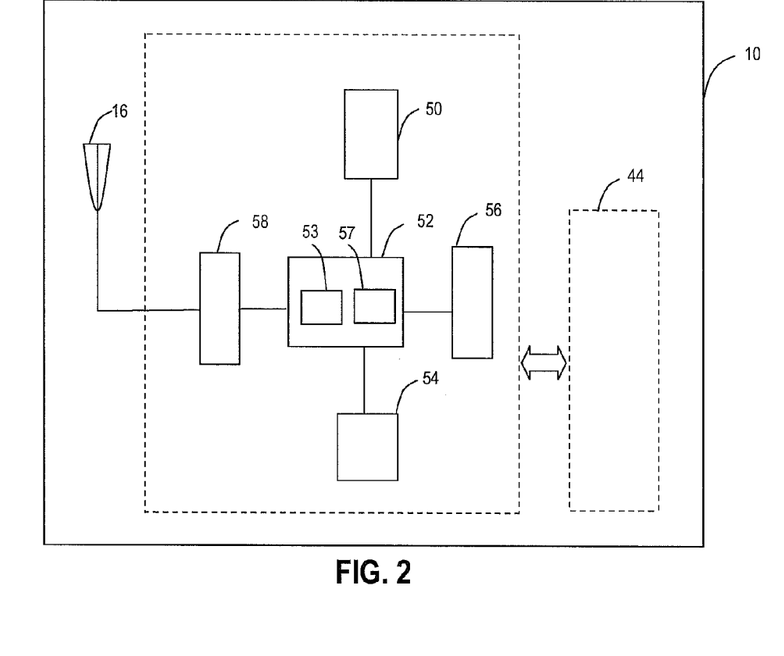
FIG. 2 shows a simplified block diagram of the exemplary wireless communication device of FIG. 1.

Referring to FIG. 2, a simplified block diagram of the wireless handset 10 is shown. The wireless handset 10 includes a memory module 50 for storing input data and a control module 52 for controlling the operation of the wireless handset 10. In the illustrative case that the wireless handset 10 is a cell phone, the control module 52 may be, e.g., a base band processor. By way of example and not of limitation, the control module 52, which includes a processing unit 53, controls the operation of most other processing elements of the wireless handset 10, such as an input module 54, the memory module 50, and also a display module 56 associated with the display 14 of FIG. 1 for displaying data or information. The input module 54 of the wireless handset 10 is operatively coupled to the input interface 11, e.g. the key pad 22 of the wireless handset 10 shown in FIG. 1, as well as all the remaining input mechanisms such as the scrolling means 24 and buttons 26, 28, 30, 32, 38, and soft keys 34 and 36.

The memory module 50 is adapted to store input data, i.e., the memory module 50 may be used to store other data such as password data received via the input module of the wireless handset 10. The memory module also 50 provides sufficient memory to store a plurality of programs comprising a set of programming instructions with computer readable programming instructions that are communicated to a mode controller 57, which are accessible via the user selectable options with regards to the generation of a Run Call Capability Table (RCCT), which is described in greater detail below.

The control module 52 includes a mode controller 57, which controls and determines the operational mode for the illustrative mobile phone. Additionally, the one or more antennas 16 are communicatively coupled to a transceiver module 58 that supports at least two operational modes for wireless communications. A wireless operational mode is associated with a wireless communication standard and the terms are used interchangeably for purposes of this patent. For example, 802.11 is a wireless local area network (WLAN), which is also referred as wireless fidelity (Wi-Fi). There is no single 802.11x standard, and currently the most common WLAN standard is the 802.11b standard. Another illustrative wireless operational mode or wireless communication standard is code division multiple access (CDMA). CDMA is one of many mobile phone standards, and GSM is another prevalent mobile phone standard.

By way of example and not of limitation, the mode controller 57 is a software module that manages communication between two or more wireless communication standards, e.g. CDMA and 802.11b. The illustrative mode controller 57 performs various operations including the actual "handoff" between a first operational mode and a second operational mode. In the illustrative embodiment, the software of the mode controller 57 resides above the physical layers and below the user interface such as the input module 54. Alternatively, it may be part of the physical layer. The RCCT and mode controller 57 combination may use a number of parameters or inputs to select the appropriate operational mode, such as, inter alia, user preference, signal strength, packet loss, talk time, specific mobile phone or handset characteristics, radio access technology and operational mode or wireless communication protocol, and remaining battery power.

As discussed previously, the mode controller 57 is configured to control the "handoff" from the first wireless communication standard, e.g. CDMA, to the second wireless communication standard, e.g. 802.11b, seamlessly and automatically depending on the configured parameters of the wireless handset 10. For example, the mode controller 57 is configured to operate using the first operational mode, e.g. CDMA, for voice communications because of user preferences. In the event the user does not have wireless broadband speed service that is CDMA based, the mode controller 57 permits changing from the first operational mode, e.g. CDMA voice, to the second wireless standard, e.g. 802.11b, for web browsing. In this illustrative example, the mode controller 57 performs the switching as a function of the user preference.

The rechargeable battery 44 powers each of the components of the wireless handset 10. The control module 52 is operatively coupled to the rechargeable battery 44, and the control module comprises the run call capability table (RCCT) that is configured to determine the remaining battery time for each of the operational modes based on a plurality of battery power metrics. In the illustrative embodiment, the RCCT is a look-up table that is configured to determine a first remaining battery time associated with the first operational mode, e.g. CDMA, and the second remaining battery time associated with the second operation mode, e.g. 802.11b. The display module 56 is configured to display the first remaining battery time and the second remaining battery time.

Figure 3:
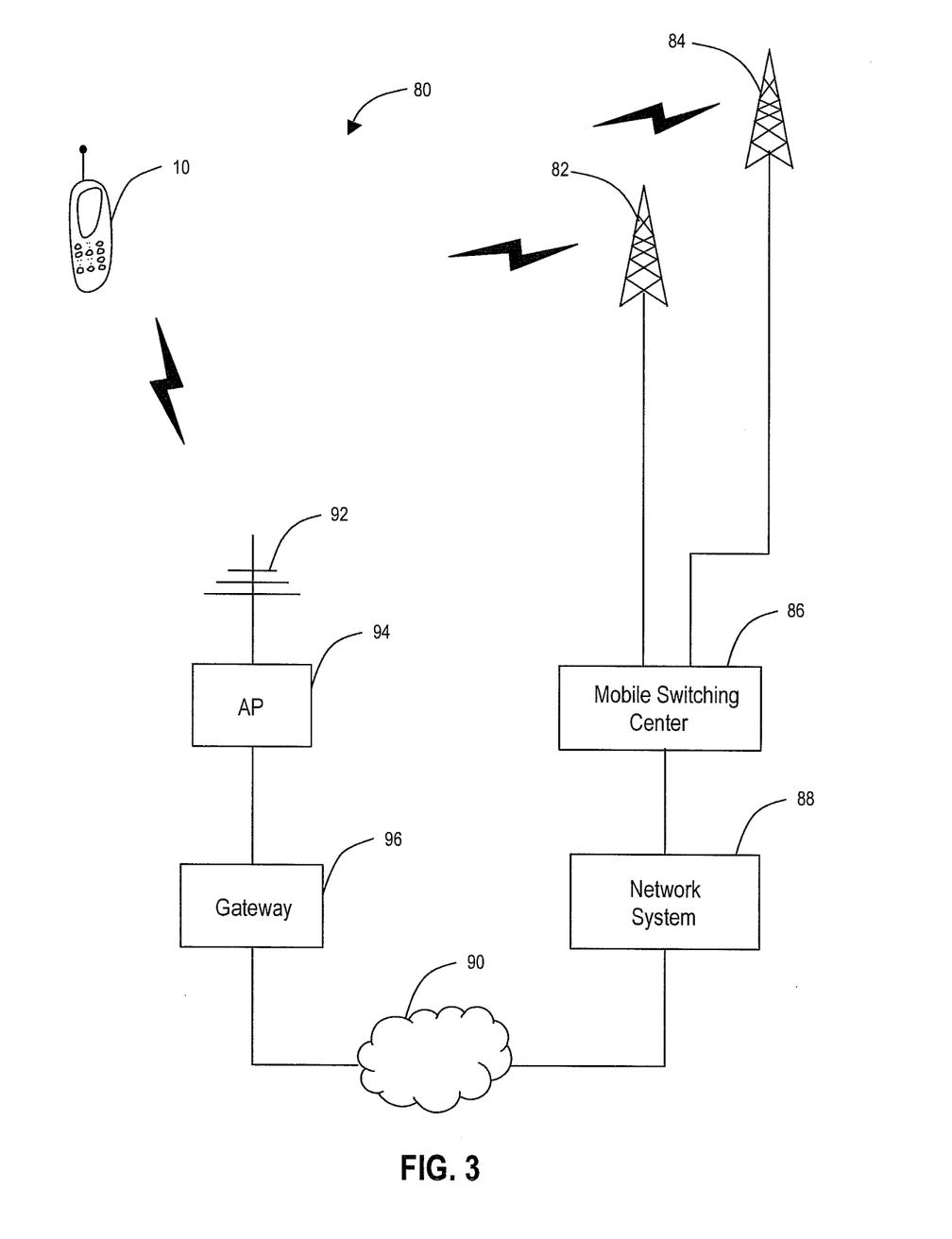
FIG. 3 is an illustrative diagram of a mobile handset configured to operate in the illustrative wireless communication system.

Referring to FIG. 3, there is shown an illustrative network communication system 80 supporting at least two operational modes for wireless communications. In the illustrative system, the wireless handset 10 is in communication with base station antenna 82 using a first operational mode such as a CDMA or GSM wireless technology. The wireless handset 10 may also be in communication with both base station antennas 82 and 84 during a handoff or handover. Both base stations are communicatively coupled to mobile switching center 86, which routes calls and reroutes them during handoff. The mobile switching center 86 is operatively coupled to a network system 88 that provides a variety of services such as voice mail or instant messaging capabilities. The network system 86 is configured to interface with a network cloud 90. The network cloud 90 may represent an Internet cloud or any other such network cloud including, but not limited to, a public switched telephony network or any other such network.

The illustrative wireless handset is also configured to communicate with the antenna 92 using a second operation mode such as 802.11b or any other such WLAN enabled antenna that is operatively coupled to an access point 94. The access point 94 provides wireless communications with wireless handset via the antenna 92. The access point is communicatively coupled to the illustrative gateway 96, which can provide security and include Network Access Translation (NAT) and Dynamic Host Control Protocol (DHCP) services. In the illustrative example, the gateway 96 is configured to access the network cloud 90 using a modem (not shown).

In the illustrative network communication system 80, the wireless handset 10 is configured to communicate with the base station antenna 82 using a first operational mode and the access point antenna 94 using the second operational mode. The mode controller 57 is configured to perform the "handoff" or switching from the first operational mode to the second operational mode. The illustrative RCCT determines the remaining battery time associated with the first operational mode and the second operational mode.

Figure 4:
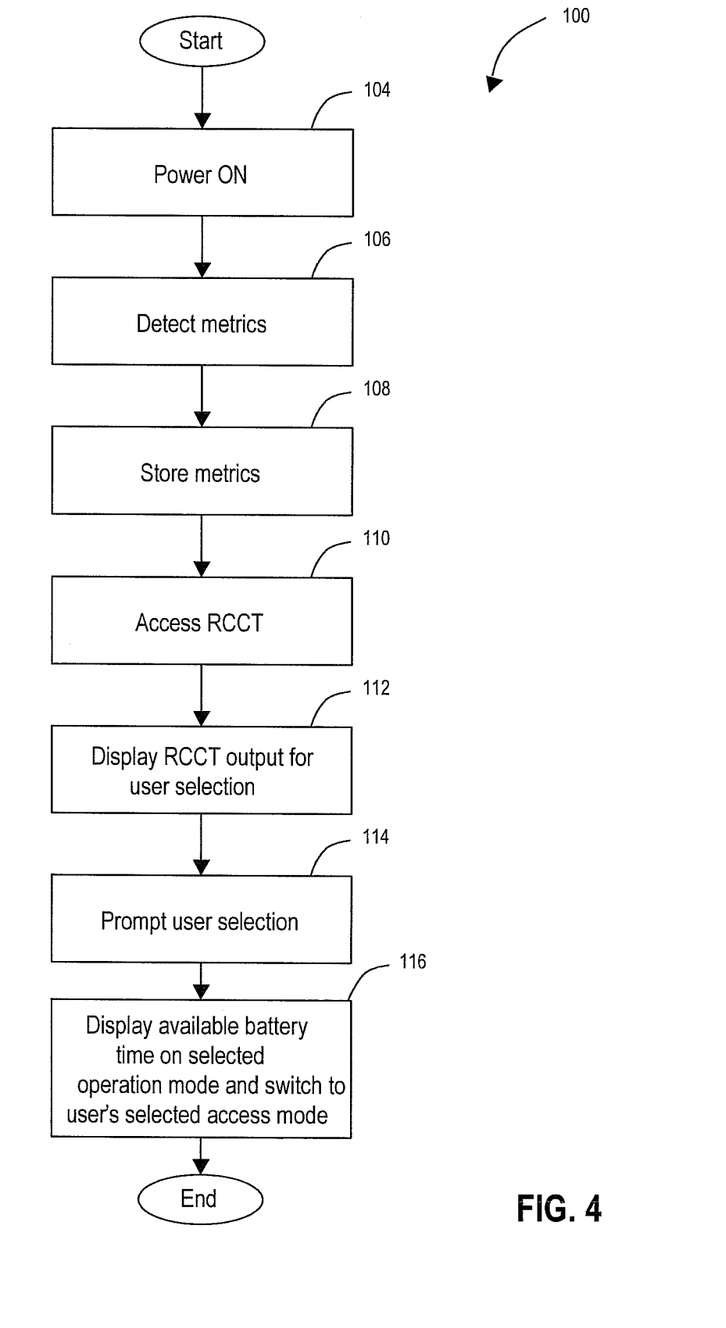
FIG. 4 shows an illustrative flowchart for optimizing battery resources in a wireless communication device according to one embodiment of the present invention.

Referring to FIG. 4, a flowchart 100 for generating a Runtime Call Capability Table (RCCT) output is shown. Upon initialization, the wireless handset 10 is first powered up by the user selecting or pressing the power ON soft key or button in the wireless handset 10 at block 104. During the "power on" process, the wireless handset 10 is initialized, i.e., an initialization routine takes place to initialize various components of the control module 52 of the wireless handset 10, as necessary to properly turn the phone on.

By way of example and not of limitation, after the wireless handset 10 has been powered on, the wireless handset 10 detects various battery power associated metrics such as current amount of battery power remaining in the battery 44 for talk or call mode, and for idle or stand by mode as indicated by block 106. Those skilled in the art shall appreciate that battery associated metrics may include other types of battery associated data, which is not to be limited to those described herein with reference to descriptions of this particular embodiment.

In block 106, the wireless handset 10 may also detect battery power associated metrics with regards to the specific operational mode that the wireless handset 10 is currently operating. For instance, in multi-mode devices or handsets, the wireless handset 10 is able to operate under different radio access technologies available in a user or subscriber's digital cellular phone service. Therefore, the wireless handset 10 is able to use multiple wireless standards including, by way of example and not of limitation, CDMA (Code Division Multiple Access or Spread Spectrum), GSM (Global System of Mobile Communications), UMTS (Universal Mobile Telecommunications System), or any other wireless communication standards such as WiMAX (Worldwide Interoperability for Microwave Access or IEEE 802.16), or any type of IEEE 802.11 network such as 802.11a, 802.11b, 802.11e, 802.11g (also referred to as WLAN), or Bluetooth, or dual band, or any type of next generation radio access system. As mentioned, it shall be appreciated by those of ordinary skill in the art that the term wireless handset, mobile handset, wireless phone, and mobile phone are all interchangeable.

Upon detection of the various battery power metrics or parameters of interest, the wireless handset 10 gathers and stores them in the memory module 50 in block 108. Because the same amount of remaining battery power in the battery 44 may yield different talk or call times, standby or idle times and data throughput when the wireless handset 10 uses different radio access technologies which can significantly affect battery power usage, the wireless handset 10, in the block 110, accesses the RCCT. The RCCT is a look-up table stored in the memory module 50 on the mobile phone that is used to provide a "short report" output. The RCCT associates the battery power metrics with the various wireless technologies supported by the wireless handset 10. When the RCCT output is generated, key information is displayed upon activation of a special menu provided in the wireless handset 10. The RCCT provides vital information on the remaining battery life or power of the mobile phone based on multiple technologies. Rather than simply informing a user via a conventional power indicator or icon in the display 14 of the wireless handset 10, mobile phones and handsets which support multiple radio access technologies can generate the RCCT using the battery power metrics described. Depending on the current radio technology being used, the wireless handset 10 is capable of estimating as well as comparing the battery power life of the wireless handset 10 if the user were to switch radio access to a different operational mode.

Accordingly, in block 112, the wireless handset 10 displays the RCCT table output for user review and selection. The RCCT table output displays information on the corresponding battery time for different available radio access technologies and conveys this information for user selection in the RCCT. This way, the user may proactively choose the specific radio access technology he prefers to use to optimize the remaining battery power in the mobile phone as well as managing his battery resources as necessary. In other words, the user may review in the RCCT output and to choose which operational mode to use based on the battery power information provided by the RCCT. Moreover, the user is allowed to actively control and switch access technologies manually based on parameters of interest such as pricing, battery usage efficiency, talk time, data rate, standby time, packet loss, signal strength and the like, rather than relying solely on the mobile phone's default settings. Therefore, the RCCT may also provide pricing information as well so that the user can control whether a switch is desired or not.

After the RCCT is displayed in the block 112, for example, the wireless handset 10 prompts the user to either remain with the current operational mode or to select a different operational mode at block 114. The user accordingly selects the operational mode based on the RCCT information, and in block 116, the wireless handset 10 displays the available battery time of the selected mode and automatically switches to the selected operational mode.

Figure 5:
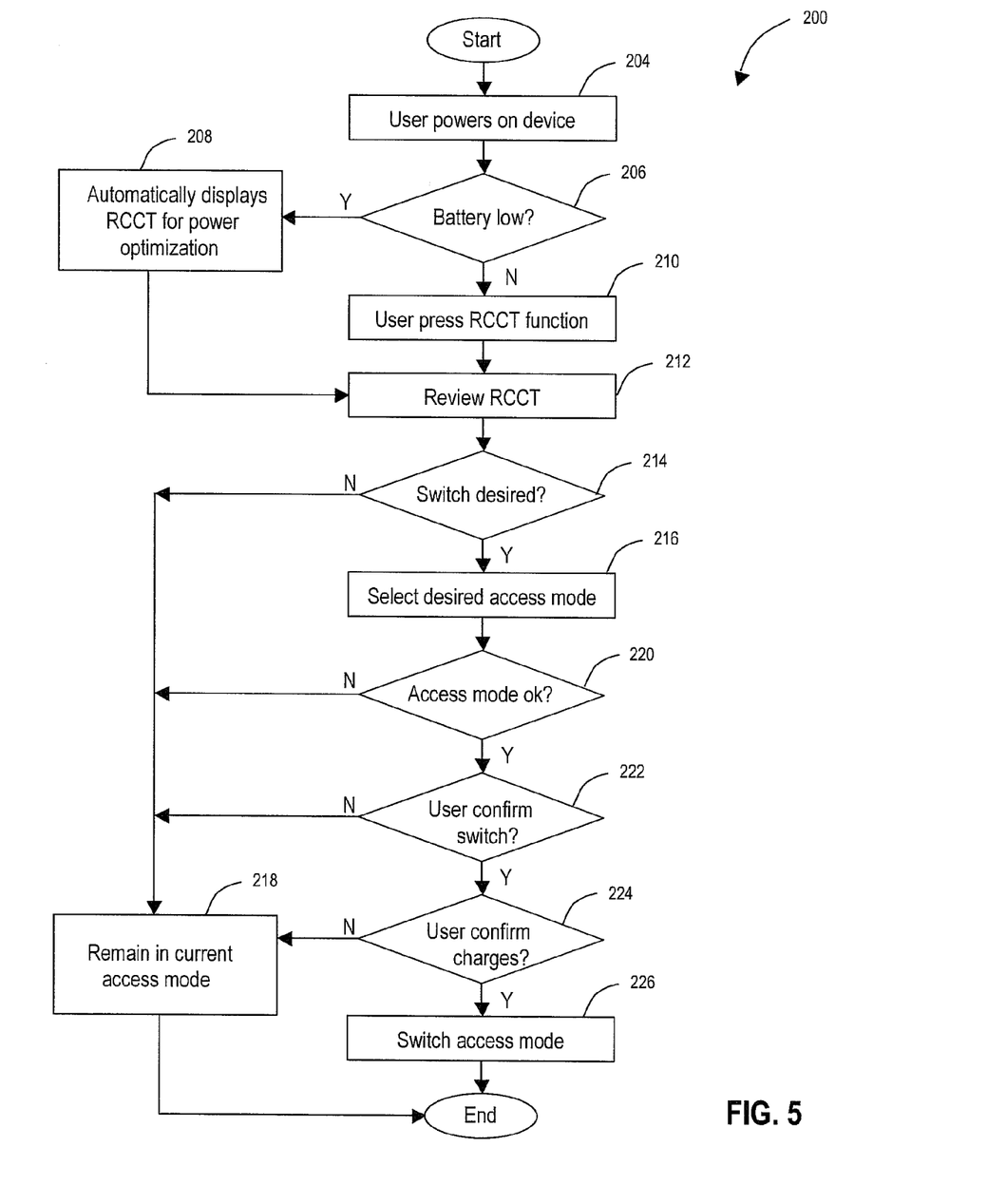
FIG. 5 shows an illustrative flowchart for utilizing the feature illustrated in FIG. 4 of the wireless communication device.

Referring to FIG. 5, there is shown an illustrative flowchart 200 that describes an illustrative mechanism for implementing the use of the RCCT in the wireless handset 10, from the standpoint of the mobile phone user interface, as indicated in the display 14. After starting the process, the user powers up the device, as previously described in FIG. 4 in block 204. Next, after all the initialization routines have been performed, the mobile phone checks and verifies the battery power level remaining in the wireless handset 10 at block 206. If the battery power is low or has fallen below a predetermined threshold level, then the wireless handset 10 automatically displays the RCCT output at block 208. On the other hand, if the battery power level remaining is not significantly low to risk possible shutdown and imminent power off of the wireless handset 10, then the mobile phone may simply display the user interface. In this case, the user may also consult and check the RCCT output if the user selects the special menu for displaying the RCCT function at block 210. If the user selects to display the RCCT output or if on noticing that the battery icon on the display 14 of the mobile phone is showing remaining battery to be low (e.g., less than half), the user selects the "display RCCT" menu/soft key option and the RCCT output is displayed at block 212.

Next, either on noticing that the battery icon on the display 14 of the mobile phone is showing remaining battery to be low (e.g., less than half), or based on the RCCT output, the user determines whether to switch to a different operational mode at decision diamond 214. The user selects a different wireless communication standard at block 216. If the user selects a different operational mode, then the wireless handset 10 checks to see if this access mode is available at decision diamond 220.

At decision diamond 222, the user interface of the wireless handset 10 prompts the user to confirm whether the user truly desires to switch from a first operational mode to a second operational mode. If yes, then, a second confirmation prompt is provided at decision diamond 224 to eliminate any inadvertent errors which may occur if the user incorrectly presses the confirmation soft key. The second confirmation may be in the form such as asking the user if the user accepts any possible additional charges that may be incurred if the wireless handset 10 switches operational mode. As described previously, the RCCT output may also provide corresponding pricing information depending on the prices of each respective radio access operational mode or technology.

On the other hand, if the user does not confirm the switch in decision diamonds 222 and 224, then the wireless handset 10 remains in the current operational mode and no switch takes place. Upon user confirmation of the selection, the access technology or operational mode of the mobile phone is switched in block 226, and the process then ends.

Referring now to FIGS. 6-9, illustrative diagrams of the display 14 of the wireless handset 10 of FIG. 1 are shown, illustrating various representations of relevant user interface data in the wireless handset 10, according to one embodiment of the present invention.

Figure 6:
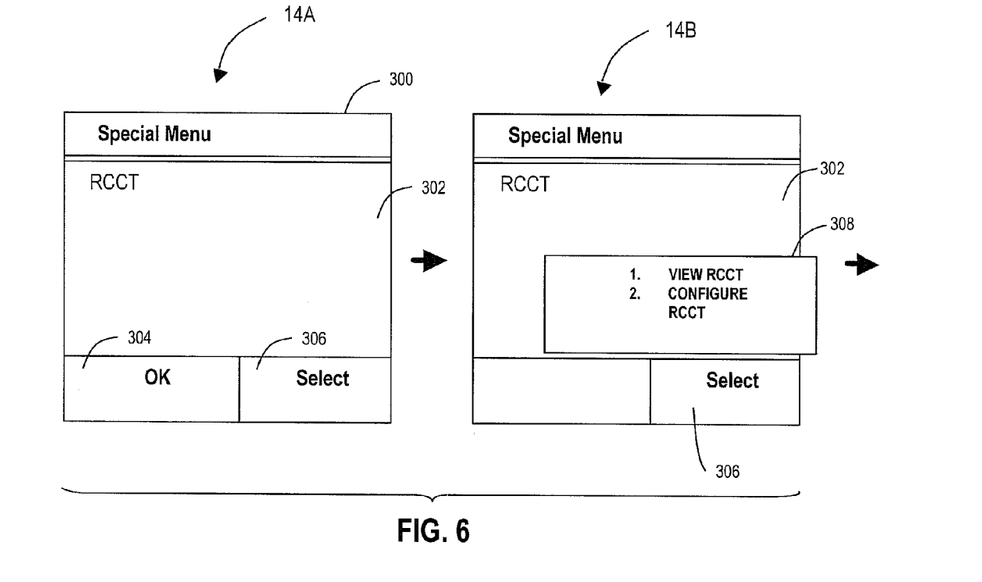
FIG. 6 shows an illustrative diagram of a display of the wireless communication device of FIG. 1, showing various representations of relevant data, according to one embodiment of the present invention.

With reference to FIG. 6, the user interface of the wireless handset 10 is shown in displays 14A and 14B, which includes a special menu 300. It shall be appreciated by those skilled in the art that the special menu 300 may be implemented in a number of ways in the wireless handset 10 depending on handset design specifications (e.g., settings). In the special menu 300, the user may select to activate an RCCT display 302 in the display 14A. User options shown in the display 14A may be pressed by the user pressing the soft keys associated with the user options. For example, user option 304 is for inputting a confirmation such as OK, and user option 306 "select" is to see further options or selections associated with the special menu 300, i.e., the RCCT display 302, from which the uses may further choose other preferences. Accordingly, when the user presses the soft key, e.g., soft key 36 in the wireless handset 10, associated with the user option 306, a pop up menu 308 appears for user selection. The user has the option to either view the RCCT output or to configure the RCCT table.

Those skilled in the art shall appreciate that configuring the RCCT may involve adjusting the parameters of the battery power or adding, deleting radio access technologies, and the like. Any number of RCCT configuration arrangements may be implemented. For example, a set of preferences may be set by the user which dictates the mobile phone's selection of radio access scheme automatically. These preferences may also include complex conditional logic for radio selections. Additionally, there may be other set of preferences where users may program time-of-day/service-plan sensitive cost structures for talk times on different radio access technologies. The RCCT can then be used to estimate the cost on the remaining talk time on each radio access scheme thus helping users decide the radio access scheme of choice. Not only is the RCCT practical and useful for the user, it may also be used by the mobile device software internally to dynamically choose radio access technology based on the application that the user wishes to run.

Furthermore, it is possible to have the RCCT updated over-the-air based on the mobile phone specification and network particulars with appropriate support both from mobile phone and its cellular service infrastructure. The RCCT is specific to handset models and is thus tailored to a particular handset or phone, types of services offered, pricing and even the type of battery. For example, if a service provider provides free minutes during a period of time (e.g., after 10 pm), then this feature may be programmed into the mobile phone and the user is notified automatically by the phone and via the RCCT that a switch may save the user money. That is, the user may select which mode to use as a function of battery time as well as talk time and pricing plans. Therefore, the RCCT may vary based on several parameters such as receiver sensitivity, transmit gain, battery properties and the overall power consumption characteristics of mobile phones. Moreover, it is possible to incorporate learning mechanism to improve the accuracy of the RCCT where after the initial RCCT is generated, upon further gathering of data, the RCCT is updated and the displayed information is improved.

Figure 7:
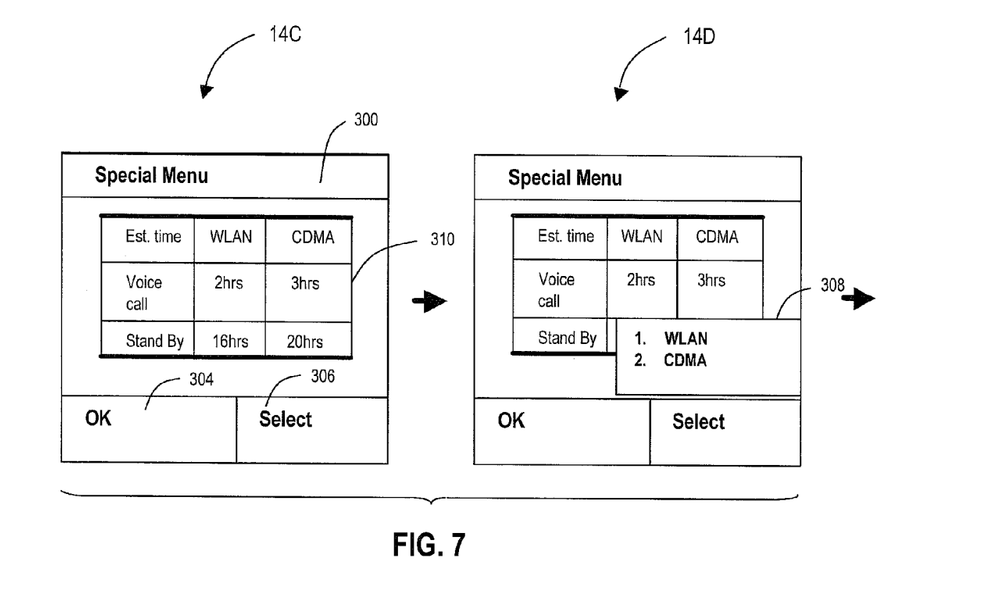
FIG. 7 shows another illustrative diagram of a display of the wireless communication device of FIG. 1.

Referring to FIG. 7, the user then selects the option 1 in the pop up menu 308, which is to view the RCCT output. As a result, a RCCT output 310 is shown in the display 14C. By way of example and not of limitation, the RCCT output 310 shows the extrapolated corresponding estimated times of battery life for two different radio access technologies, e.g., WLAN and CDMA, when the wireless handset 10 is either in the voice call mode or in the standby or idle mode. The RCCT output 310 may be larger and have more information provided in them than shown in this embodiment, since the RCCT is a dynamic look up table where more information may be added and because the RCCT permits interpolation and extrapolation. The algorithm for developing the illustrative RCCT look-up table may be specific to a particular handset according to the manufacturer specifications with regards to parameters such as received signal strengths and other phone sensitivities such as standby time. In RCCT output 310, the battery life is 2 hours in voice call mode using the WLAN operational mode, but if the user were to utilize the CDMA operational mode, the battery life would be an additional hour, i.e., 3 hours, whereas in standby mode in WLAN, the battery life is 16 hours and in CDMA mode, it is 20 hours. As shown in this example, WLAN uses up more battery life than CDMA. Persons with skill in the art may appreciate that a current mode may be indicated by some distinctive mark such as bold or color lettering. In other words, if the current operational mode is WLAN, the WLAN column may be indicated in red or bold fashion so the user knows which operational mode is currently working.

It shall be appreciated by those with skill in the art that separate tables for different types of radio access technologies or schemes may be provided, such as for CDMA 1X, IEEE 802.11b, IEEE 802.11g, which are supported by the wireless handset 10. The RCCT table 310 is in the form of a user friendly table. For example, with RSSI and remaining battery power as inputs, battery power metrics such as call voice time or talk time, data rate time (for each data rate) and standby times on different radio technologies are estimated.

The RCCT look-up tables vary based on receiver sensitivity, transmit gain, battery properties and the overall power consumption characteristics of the specific mobile phone. For example, the input parameters for the RCCT look-up table are the received signal strength of the wireless handset 10 and the remaining battery time. The signal strength of the current radio access technology being used by the wireless handset 10 is already known. However, when the user selects the menu item/softkey from the user interface, it triggers the mode controller 57 to send a scan on the other radio access technologies supported by the mobile phone. The wireless handset 10 then estimates the received signal strength of the other radio schemes present in the environment based on the scan response. The remaining battery power is also known since the battery icon displayed in the mobile phone must be frequently updated. Other input parameters may also affect the RCCT output 310 such as network variables controlled by the service provider. For example, Quality of Service (QoS) issues are important for CDMA protocols because it affects the bit error rate (BER). Coupled with signal strength (or beacon strength for WLAN), the CDMA protocol also depends on Ec/Io and the amount of transmit power associated with a network base station. Therefore, in addition to specific handset particulars, QoS, BER, and Ec/Io also affect the RCCT look-up table.

By way of example and not of limitation, using CDMA or 802.11b as one of the operational modes or wireless standard technologies available to the wireless handset 10, the following illustrate RCCT look-up tables (Table 1 and Table 2) that may be generated for both talk time and standby times depending on the remaining battery power as a function of the received signal strength.

TABLE 1

(Sample Talk Time Table in 802.11b)

| Received Signal Strength | Full battery | Three Quarters | Half battery | Quarter battery |
|---|---|---|---|---|
| −20 dbm | 3.5 hrs | 2.5 hrs | 2 hrs | 1 hrs |
| −40 dbm | 3.5 hrs | 2.5 hrs | 2 hrs | 1 hrs |
| −60 dbm | 3.0 hrs | 2.2 hrs | 1.4 hrs | 0.6 hrs |
| −80 dbm | 2.0 hrs | 1.6 hrs | 0.9 hrs | 0.3 hrs |

TABLE 2

(Sample Standby Time Table in CDMA)

| Received Signal Strength | Full battery | Three Quarters | Half battery | Quarter battery |
|---|---|---|---|---|
| −20 dbm | 24 hrs | 16 hrs | 12 hrs | 6 hrs |
| −40 dbm | 24 hrs | 16 hrs | 12 hrs | 6 hrs |
| −60 dbm | 22 hrs | 14 hrs | 10 hrs | 5 hrs |
| −80 dbm | 18 hrs | 10 hrs | 8 hrs | 4 hrs |

Upon viewing the RCCT output 310, the user may decide which option is preferable based on the amount of battery time left and also depending on how long the user must go without recharging the wireless handset 10 battery 44. For example, if the user must make a number of calls and is expecting to receive important messages at any moment and knows that recharge of batteries will be at least more than three hours away, the user may desire to switch to the CDMA operational mode to optimize the use of the wireless handset 10 so that its battery life is prolonged for as long as possible. In that case, with the user option 306 "select" displayed in the display 14D, the user selects this option by using the scrolling means 24 of the wireless handset 10 to choose to switch to the CDMA operational mode listed under item 2.

Figure 8:
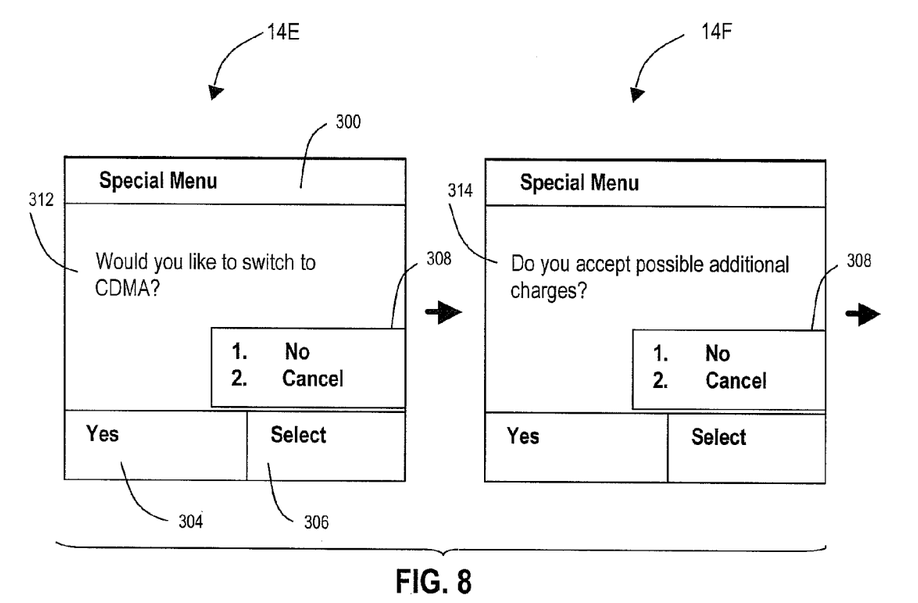
FIG. 8 shows another illustrative diagram of a display of the wireless communication device of FIG. 1.

Referring to FIG. 8, once the user has chosen to switch to the CDMA operational mode, the wireless handset 10 prompts the user to provide confirmation by requesting that the user to confirm or deny the request, such as in question 312 ("would you like to switch to CDMA?"). A "yes" user option 304 confirms the switch request and user option 306 "select" provides either a "no" confirmation or a "cancel" request, as illustrated in display 14E. Similarly, in the next display 14F, the wireless handset 10 further requests that the user confirm whether any possible additional fees charged by the cellular service provided will be accepted or denied or cancelled, such as in question 314 ("do you accept possible additional charges?).

Figure 9:
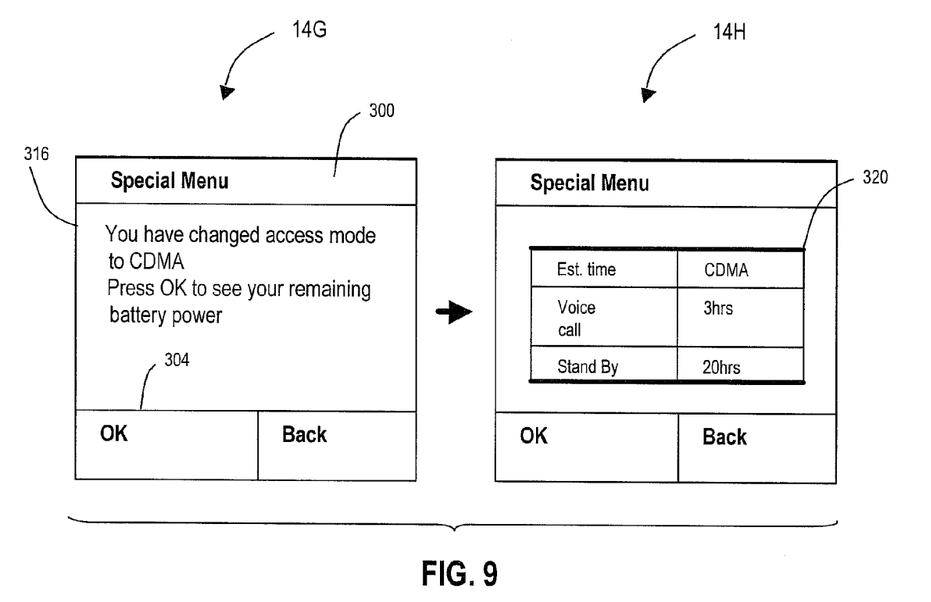
FIG. 9 shows another an illustrative diagram of a display of the wireless communication device of FIG. 1.

Referring to FIG. 9, if the user has confirmation the switch to CDMA and accepted the possible additional charges, then display 14G is shown. The wireless handset 10 confirms the switch in a message 316 and the user has the option to review again the remaining battery power as displayed in the next display 14H, where a RCCT output 320 for CDMA is shown. This way, the user knows he has 3 hours of talk time and 20 hours of standby or idle time remaining before the battery 44 must be charged up.

It is to be understood that the foregoing is a detailed description of illustrative embodiments. The scope of the claims is not limited to these specific embodiments or examples. For example, a wireless handset 10 is described, however this solution may be extended to any wireless handset in operative communication with a cellular network system. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A wireless communication device, comprising:
a rechargeable battery;
a first received signal strength input associated with a first operational mode;
a second received signal strength input associated with a second operational mode;
a control module configured to communicate using the first operational mode that supports wireless communication using a first wireless communication standard and the second operational mode that supports wireless communication using a second wireless communication standard, wherein the second operational mode is different from the first operational mode, the control module operatively coupled to the rechargeable battery and configured to determine a first remaining battery time associated with the first operational mode based on the first received signal strength input, and a second remaining battery time associated with the second operational mode based on the second received signal strength input;

a run call capability table generated by the control module, the run call capability table configured to determine the first remaining battery power and the second remaining battery power with a plurality of battery power metrics that include the received signal strength and a remaining battery power that are used to determine the remaining voice call time and the remaining standby time;

a display operatively coupled to the control module, the display adapted to display the run call capability table, wherein the information displayed in the run call capability table comprises a plurality of battery power metrics that include the remaining voice call time estimated for the first remaining battery power and the second remaining battery power and the remaining standby time estimated for the first remaining battery power and the second remaining battery power;

wherein the run call capability table is automatically displayed when the battery power has fallen below a threshold level prompting the user to switch between the first operational mode and second operational mode;

a mode controller configured to control the handoff between the first operational mode and second operational mode; and a user interface adapted to permit user selection between the first operational mode and the second operational mode, wherein the user interface includes a remaining voice call time and a remaining standby time for each operational mode, the user interface further adapted to permit configuration of the run call capability table, wherein the run call capability table is configurable to display the cost associated with the remaining voice call time for each operational mode.

2. The wireless communication device of claim 1 wherein the control module is configured to determine the remaining talk time and the remaining standby time associated with the first operational mode and the second operational mode.

3. The wireless communication device of claim 1 wherein the first operational mode comprises CDMA (Code Division Multiple Access or Spread Spectrum) and the second operational mode comprises WLAN (Wireless Local Area Network).

4. The wireless communication device of claim 1 wherein the first operational mode comprises GSM (Global System of Mobile Communications) and the second operational mode comprises WLAN (Wireless Local Area Network).

5. A wireless communication system, comprising:
a plurality of first antennas adapted to communicate with a wireless communication device using a first operational mode;
a second antenna adapted to communicate with the wireless communication device using a second operational mode that is different from the first operational mode;
a first received signal strength input associated with the first operational mode;
a second received signal strength input associated with the second operational mode;
a control module disposed on the wireless communication device that is operatively coupled to a rechargeable battery on the wireless communication device, the control module configured to determine a first remaining battery time associated with the first operational mode based on the first received signal strength input, and a second remaining battery time associated with the second operational mode based on the second received signal strength;
a run call capability table generated by the control module, the run call capability table configured to determine the first remaining battery power and the second remaining battery power with a plurality of battery power metrics that include the received signal strength and a remaining power that are used to determine the remaining voice call time and the remaining standby time;
a display operatively coupled to the control module, the display is adapted to display the run call capability table, wherein the information displayed in the run call capability table comprises a plurality of battery power metrics that include the remaining voice call time estimated for the first remaining battery power and the second remaining battery power, and the remaining standby time estimated for the first remaining battery power and the second remaining battery power; wherein the run call capability table is automatically displayed when the battery power has fallen below a threshold level, prompting the user to switch between the first operational mode and second operational mode;
a mode controller configured to control the handoff between the first operational mode and second operational mode; and
a user interface adapted to permit user selection between the first operational mode and the second operational mode, wherein the user interface includes a remaining voice call time and a remaining standby time for each operational mode, the user interface further adapted to permit configuration of the run call capability table, wherein the run call capability table is configurable to display the cost associated with the remaining voice call time for each operational mode.

6. The wireless communication system of claim 5 wherein the first operational mode comprises CDMA (Code Division Multiple Access or Spread Spectrum) and the second operational mode comprises WLAN (Wireless Local Area Network).

7. The wireless communication system of claim 5 wherein the first operational mode comprises GSM (Global System of Mobile Communications) and the second operational mode comprises WLAN (Wireless Local Area Network).

8. A method for optimizing battery power resources for a wireless communication device, the method comprising:
accessing a network system from a wireless communication device configured to communicate using a plurality of wireless technologies, the device comprising a rechargeable battery, the device supporting a first operational mode associated with a first received signal strength input that operates using a first wireless communication standard and a second operational mode associated with a second received signal strength input that supports wireless communication using a second wireless communication standard, the network system configured to communicate with the wireless communication device;
estimating available battery power resources based at least on a plurality of battery power metrics that include the first received signal strength input, the second received signal strength input, and a remaining battery power of the rechargeable battery;
querying a corresponding table that associates the plurality of battery power metrics with the plurality of wireless technologies;
generating a table output that displays a remaining battery time estimate associated with the plurality of wireless technologies;

simultaneously displaying on the table output the plurality of battery power metrics that include the remaining voice call time estimated for each of the plurality of wireless technologies and the remaining standby time associated with each of the plurality of wireless technologies, wherein the plurality of wireless technologies comprise different types of wireless communication protocols yielding different remaining battery time estimates;

displaying the table output automatically when the battery power has fallen below a threshold level, prompting the user to switch between the first operational mode and second operational mode;

permitting a user to interact with a menu provided in a user interface that permits the user to select and switch access from one of the plurality of wireless technologies to another one of the plurality of wireless technologies, wherein the user interface includes a remaining voice call time and a remaining standby time for each operational mode, wherein the user interface further permits the user to display the cost associated with the remaining voice call time for each operational mode; and performing a handoff operation between the plurality of wireless technologies when the user selects and switches access technology in the wireless communication device from one of the plurality of wireless technologies to another one of the plurality of wireless technologies.

9. The method of claim 8 wherein said plurality of battery power metrics comprise data pertaining to a remaining talk time and a remaining stand by time for at least two of the plurality of wireless technologies.

10. The method of claim 8 wherein the plurality of battery power metrics comprise data pertaining to pricing information associated with said plurality of wireless technologies.

\* \* \* \* \*